(12) United States Patent
Wakamatsu et al.

(10) Patent No.: US 8,873,139 B2
(45) Date of Patent: *Oct. 28, 2014

(54) MICROSCOPE SYSTEM AND OBSERVATION CONTROL METHOD (75) Inventors: Takashi Wakamatsu, Yokosuka (JP); Akitoshi Suzuki, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/076,875

(22) Filed: Mar. 31, 2011

(65) Prior Publication Data
US 2011/0286091 A1 Nov. 24, 2011

Related U.S. Application Data (63) Continuation of application No. PCT/JP2009/067207, filed on Oct. 2, 2009.

(30) Foreign Application Priority Data

Oct. 2, 2008 (JP) ................................ P2008-257232

(51) Int. Cl.
*G02B 21/00* (2006.01)
*G02B 21/02* (2006.01)
*G02B 15/00* (2006.01)

(52) U.S. Cl.
CPC .............. *G02B 21/025* (2013.01); *G02B 15/00* (2013.01); *G02B 21/00* (2013.01)
USPC ............ 359/380; 359/368; 359/432; 359/676

(58) Field of Classification Search
CPC ........ G02B 15/00; G02B 15/02; G02B 15/04; G02B 15/10; G02B 15/12; G02B 21/00; G02B 21/0004; G02B 21/02; G02B 21/025

USPC .......................................... 359/368–390, 676
See application file for complete search history.

(56) References Cited

U.S. PATENT DOCUMENTS

| 5,276,550 | A | * | 1/1994 | Kojima | 359/368 |
| 5,396,063 | A |   | 3/1995 | Ito et al. | |
| 5,703,714 | A | * | 12/1997 | Kojima | 359/368 |
| 7,773,297 | B2 | * | 8/2010 | Matsukawa et al. | 359/380 |

FOREIGN PATENT DOCUMENTS

| JP | 5-341197 | 12/1993 |
| JP | 2004-4856 | 1/2004 |

OTHER PUBLICATIONS

International Search Report for PCT/JP2009/067207, mailed Oct. 27, 2009.
Notification of Reasons for Refusal dated Jun. 21, 2012 in corresponding Japanese Patent Application No. 2010-531914.

* cited by examiner

*Primary Examiner* — Thong Nguyen
(74) *Attorney, Agent, or Firm* — Staas & Halsey LLP (57) ABSTRACT

A microscope system and observation control method. An electric zoom consecutively changes a magnification for a sample. A revolver includes a plurality of objective lenses of different magnifications and switches the objective lens placed in an observation optical path to intermittently change the magnification for the sample. A control section calculates a total magnification at which the sample is observed based on a magnification provided by the electric zoom and the magnification of the objective lens currently placed in the observation optical path. The control section operates when the revolver switches the objective lens placed in the observation optical path, to determine a target magnification that is the magnification of the electric zoom required to keep the total magnification obtained after the switching of the objective lens equal to the total magnification obtained before the switching of the objective lens.

8 Claims, 6 Drawing Sheets

| MAGNIFICATION OF ELECTRIC ZOOM | MAGNIFICATION OF OBJECTIVE LENS | | |
|---|---|---|---|
| | 0.5 (ADDRESS 1) | 1 (ADDRESS 2) | 2.5 (ADDRESS 3) |
| 0.7 | 0.35 | 0.7 | 1.75 |
| 0.8 | 0.4 | 0.8 | 2 |
| 0.9 | 0.45 | 0.9 | 2.25 |
| 1 | 0.5 | 1 | 2.5 |
| 1.1 | 0.55 | 1.1 | 2.75 |
| 1.2 | 0.6 | 1.2 | 3 |
| 1.3 | 0.65 | 1.3 | 3.25 |
| 1.4 | 0.7 | 1.4 | 3.5 |
| 1.5 | 0.75 | 1.5 | 3.75 |
| 1.6 | 0.8 | 1.6 | 4 |
| 1.7 | 0.85 | 1.7 | 4.25 |
| 1.8 | 0.9 | 1.8 | 4.5 |
| 1.9 | 0.95 | 1.9 | 4.75 |
| 2 | 1 | 2 | 5 |
| 2.1 | 1.05 | 2.1 | 5.25 |
| 2.2 | 1.1 | 2.2 | 5.5 |
| 2.3 | 1.15 | 2.3 | 5.75 |
| 2.4 | 1.2 | 2.4 | 6 |
| 2.5 | 1.25 | 2.5 | 6.25 |
| ⋮ | ⋮ | ⋮ | ⋮ |
| 14.5 | 7.25 | 14.5 | 36.25 |
| 14.6 | 7.3 | 14.6 | 36.5 |
| 14.7 | 7.35 | 14.7 | 36.75 |
| 14.8 | 7.4 | 14.8 | 37 |
| 14.9 | 7.45 | 14.9 | 37.25 |
| 15 | 7.5 | 15 | 37.5 |

MICROSCOPE SYSTEM AND OBSERVATION CONTROL METHOD

CROSS-REFERENCE TO RELATED APPLICATIONS

This application is a continuation application, filed under 35 USC 111(a), of International Application PCT/JP2009/067207, filed Oct. 2, 2009, and claims foreign priority to Japanese application 2008-257232, filed Oct. 2, 2008, and which are incorporated herein by reference in their entireties.

TECHNICAL FIELD

The present invention relates to a microscope system and observation control method, and in particular, to a microscope system and observation control method configured to allow operability to be improved.

BACKGROUND ART

As a scheme for changing a total magnification at which samples are magnified for observation, microscopes conventionally adopt various schemes such as switching of an objective lens and the use of a zoom lens.

For example, in the scheme of switching the objective lens, a lens revolver with a plurality of objective lenses of different magnifications installed therein is utilized to switch the objective lens inserted into an observation optical path. Thus, the magnification can be intermittently changed simply by rotating the lens revolver. Furthermore, in the scheme utilizing the zoom lens, the magnification can be linearly changed by consecutively moving the zoom lens in a zoom ring provided that the zoom lens is moved within the movable range thereof.

Additionally, in a microscope including a lens revolver or a zoom lens, the operability of the microscope can be improved by electrically driving rotation of the lens revolver or movement of the zoom lens.

In particular, in many cases, a stereoscopic microscope with which a user observes biological samples intact uses both the scheme of switching the objective lens and the scheme utilizing the zoom lens. The stereoscopic microscope thus enables linear changes in magnification and allows widening of the range within which the magnification can be varied.

For example, Patent Literature 1 discloses a microscope system including an objective switching mechanism configured to electrically switch the objective lens and a zoom mechanism configured to move the zoom lens.

Furthermore, Patent Literature 2 discloses a technique to detect the rotation direction of the revolver when the revolver is rotated, to predict which of the objective lenses the current one is to be switched to.

CITATION LIST

Patent Literature

[Patent Literature 1] Japanese Patent Laid-Open No. 2004-4856
[Patent Literature 2] Japanese Patent Laid-Open No. 5-341197

SUMMARY OF INVENTION

Technical Problem

In the microscope configured to use both the scheme of switching the objective lens and the scheme utilizing the zoom lens as described above, when the magnification is changed using the zoom lens, the resultant change is linear, thus preventing a user from missing an observation position on the sample. In contrast, when the magnification is changed using the objective lens, the resultant change is significant, causing a great change in observation field of view. Hence, the user is likely to miss the observation position on the sample. Therefore, such a microscope is difficult to handle smoothly unless the user is skilled in handling of the microscope.

The present invention has been developed in view of the above-described circumstances, and allows the operability to be improved.

Solution to Problem

A microscope system according to the present invention is configured to magnify a sample for observation, and includes a zoom section for consecutively changing a magnification for the sample, a switching section including a plurality of objective lenses of different magnifications and for switching the objective lens placed in an observation optical path to intermittently change the magnification for the sample, a zoom magnification determining section operating when the switching section switches the objective lens placed in the observation optical path, to determine the magnification (target magnification) of the zoom section required to keep a total magnification obtained after the switching of the objective lens equal to a total magnification obtained before the switching of the objective lens, and a zoom control section for controlling the zoom section in such a manner that the magnification of the zoom section is set equal to the target magnification determined by the zoom magnification determining section.

An observation control method according to the present invention is used for a microscope comprising a zoom section for consecutively changing a magnification and a plurality of objective lenses of different magnifications, to magnify a sample for observation, the observation control method including switching the objective lens placed in an observation optical path to intermittently change the magnification for the sample, determining, when the objective lens placed in the observation optical path is switched, the magnification (target magnification) of the zoom section required to keep the total magnification obtained after the switching of the objective lens equal to the total magnification obtained before the switching of the objective lens, and controlling the zoom section in such a manner that the magnification of the zoom section is set equal to the determined target magnification.

In the microscope system and observation control method according to the present invention, the zoom section consecutively changes the magnification for the sample. The objective lens placed in the observation optical path to intermittently change the magnification for the sample. When the switching section switches the objective lens placed in the observation optical path, the magnification (target magnification) of the zoom section required to keep the total magnification obtained after the switching of the objective lens equal to the total magnification obtained before the switching of the objective lens is determined. The zoom section is then controlled to set the magnification of the zoom section equal to the target magnification determined.

Advantageous Effects of Invention

The microscope system and observation control method according to the present invention allows the operability to be improved.

DESCRIPTION OF EMBODIMENTS

A specific embodiment to which the present invention is applied will be described below in detail with reference to the drawings.

Figure 1:
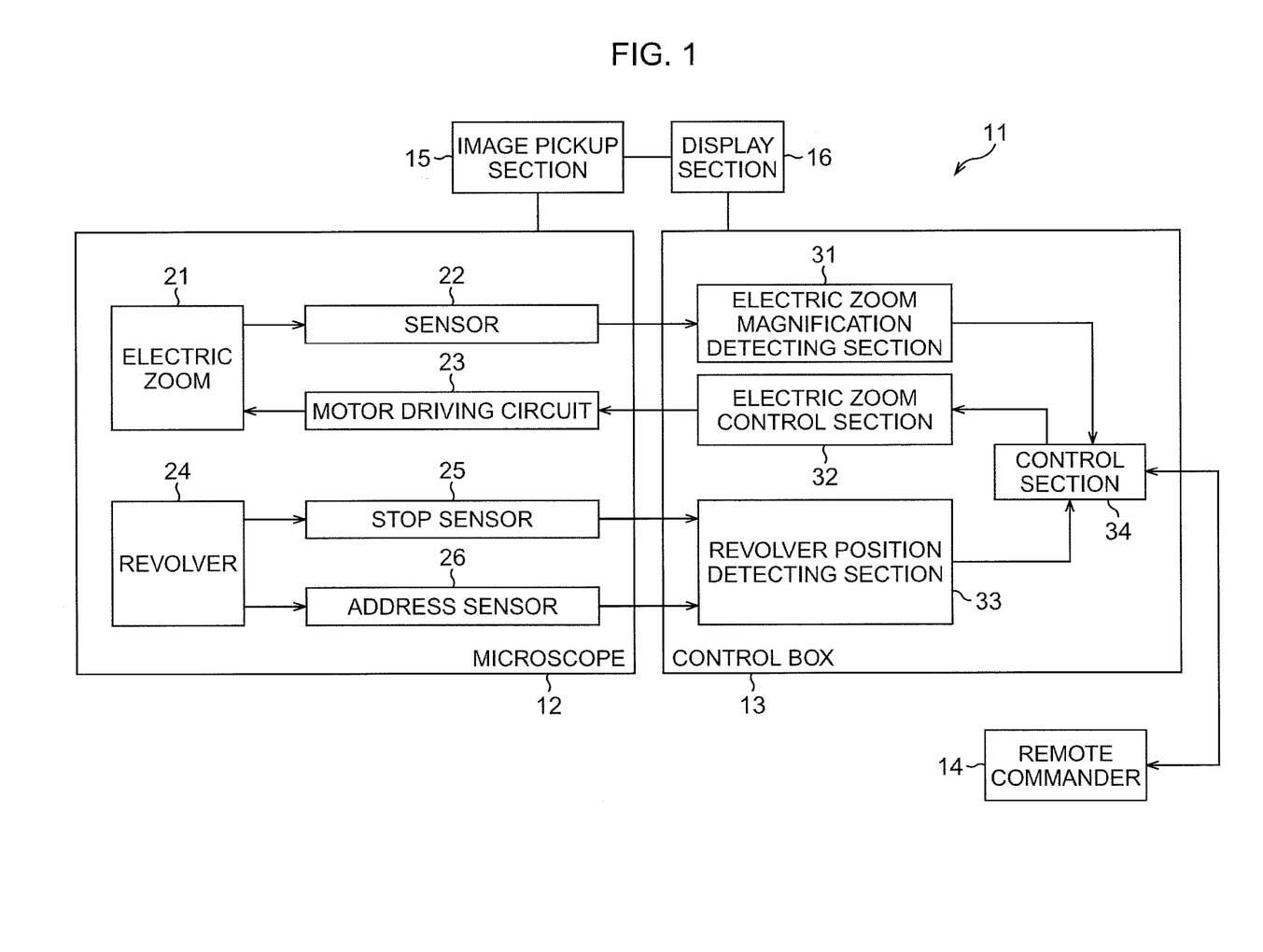
FIG. 1 is a block diagram illustrating an example of configuration of an embodiment of a microscope system to which the present invention is applied.

FIG. 1 is a block diagram illustrating an example of configuration of an embodiment of a microscope system to which the present invention is applied.

In FIG. 1, the microscope system 11 includes a microscope 12 configured to allow a user to observe a sample at a predetermined magnification, a control box 13 configured to control components of the microscope 12, a remote commander 14 configured to input the user's operations on the microscope 12 to the control box 13, an image pickup section 15 configured to pick up images of samples via the microscope 12, and a display section 16 configured to display images picked up by the image pickup section 15.

The microscope 12 includes an electric zoom 21, a sensor 22, a motor driving circuit 23, a revolver 24, a stop sensor 25, and an address sensor 26.

The electric zoom 21 includes a plurality of zoom lenses and a motor configured to drive the zoom lenses (none of the zoom lenses and the motor are illustrated). The zoom lenses change in position when driven by the motor. This allows the magnification of the microscope 12 to change linearly.

The sensor 22 supplies a signal indicative of the position of each zoom lens to an electric zoom magnification detecting section 31 of the control box 13. For example, the sensor 22 is formed of a potentiometer or the like. The potentiometer offers a resistance value changed in response to movement of the zoom lenses of the electric zoom 21. The sensor 22 outputs such a signal as has a voltage changed depending on the resistance value, that is, a signal indicative of the position of each zoom lens.

The motor driving circuit 23 supplies the motor of the electric zoom 21 with power required to move the zoom lens of the electric zoom 21, in accordance with a control signal provided by an electric zoom control section 32 of the control box 13 as described below. In the electric zoom 21, the motor moves the zoom lenses in accordance with the power supplied by the motor driving circuit 23. The zoom lenses are then placed at positions corresponding to the magnification set in accordance with the control performed by the electric zoom control section 32.

The revolver 24 includes a plurality of objective lenses (not shown in the drawings) of different magnifications. The user rotates the revolver 24 to insert one of the objective lenses which has a desired magnification into an observation optical path. Furthermore, the revolver 24 has addresses set therein which identify installation locations where the respective objective lenses are installed. The revolver 24 also includes a click stop mechanism configured to stop any of the objective lenses on an optical axis in the observation optical path. The click stop mechanism exerts a given force to hold the revolver 24 to stop the rotation thereof. Thus, the objective lens is positioned on the optical axis.

The stop sensor 25 detects whether or not the revolver 24 has stopped rotation with the objective lens placed on the optical axis, that is, whether or not the click stop mechanism has held the revolver 24 to stop the rotation thereof to place the objective lens on the optical axis. Then, the stop sensor 25 supplies a signal indicating whether or not the revolver 24 has stopped rotation, to a revolver position detecting section 33 of the control box 13.

The address sensor 26 includes, for example, a hall element to detect the address identifying the installation location where the objective lens placed on the optical axis is installed.

The control box 13 includes the electric zoom magnification detecting section 31, the electric zoom control section 32, the revolver position detecting section 33, and a control section 34.

The electric zoom magnification detecting section 31 is supplied with a signal from the sensor 22 which is indicative of the position of each zoom lens. The electric zoom magnification detecting section 31 then determines the magnification of the electric zoom 21 based on the position of each zoom lens. The electric zoom magnification detecting section 31 then supplies a signal indicative of the magnification of the electric zoom 21 to the control section 34. For example, the electric zoom magnification detecting section 31 is configured to pre-store a table in which the signal (voltage value) indicative of the position of each zoom lens is associated with the magnification of the electric zoom 21. The electric zoom magnification detecting section 31 references the table to determine the magnification of the electric zoom 21.

The electric zoom control section 32 is supplied with a signal from the control section 34 which specifies an increase or a decrease in the magnification of the electric zoom 21. In accordance with the signal, the electric zoom control section 32 supplies the motor driving circuit 23 with a control signal causing the zoom lenses of the electric zoom 21 to move.

Furthermore, the, electric zoom control section 32 is supplied with a signal from the control section 34 which is indicative of the target magnification, as described below. Based on the signal, the electric zoom control section 32 determines the amount by which the electric zoom 21 moves the zoom lenses. The electric zoom control section 32 then supplies the motor driving circuit 23 with a control signal causing the zoom lenses to move by the amount. Thus, the motor driving circuit 23 supplies the motor of the electric zoom 21 with power corresponding to the control signal from the electric zoom control section 32. The motor driving circuit 23 thus causes the zoom lenses to be placed at the positions corresponding to the target magnification.

The revolver position detecting section 33 is supplied with a signal from the stop sensor 25 which indicates whether or not the revolver 24 has stopped rotation. The revolver position detecting section 33 reads the address from the revolver 24 detected by the address sensor 26 at a timing when the state indicated by the signal from the stop sensor 25 shifts from the one in which the revolver 24 has not stopped rotation to the one in which the revolver 24 has stopped rotation. That is, the revolver position detecting section 33 operates as follows when the user rotates the revolver 24 to switch the objective lens. When the revolver 24 stops rotation and any of the objective lenses is placed on the optical axis, the revolver position detecting section 33 detects, via the address sensor 26, the address in the revolver 24 which identifies the installation location where the objective lens is installed. Then, the revolver position detecting section 33 supplies the control section 34 with a signal indicative of the address identifying the installation location of the objective lens placed on the optical axis.

The control section 34 includes a CPU (Central Processing Unit), a ROM (Read Only Memory), and a RAM (Random Access Memory). The CPU loads a program stored in the ROM, into the RAM and executes the program to control the relevant sections of the control box 13.

As described above, the control section 34 is supplied with the signal from the electric zoom magnification detecting section 31 which is indicative of the magnification of the electric zoom 21 and the signal from the revolver position detecting section 33 which is indicative of the address identifying the installation location of the objective lens placed on the optical lens. Based on the signals, the control section 34 calculates the total magnification at which the sample is magnified by the microscope 12.

For example, the RAM of the control section 34 is configured to store the addresses of the installation locations and the magnifications of the objective lenses in association with one another. The control section 34 multiplies the magnification of the electric zoom 21 by the magnification of the objective lens associated with the address indicated by the signal from the revolver position detecting section 33 to determine the total magnification.

Furthermore, the control section 34 is supplied with an operation signal from the remote commander 14 which corresponds to an operation performed on the remote commander 14 by the user. In accordance with the operation signal, the control section 34 supplies the electric zoom control section 32 with a signal specifying an increase or a decrease in the magnification of the electric zoom 21.

Here, the remote commander 14 will be described with reference to FIG. 2.

Figure 2:
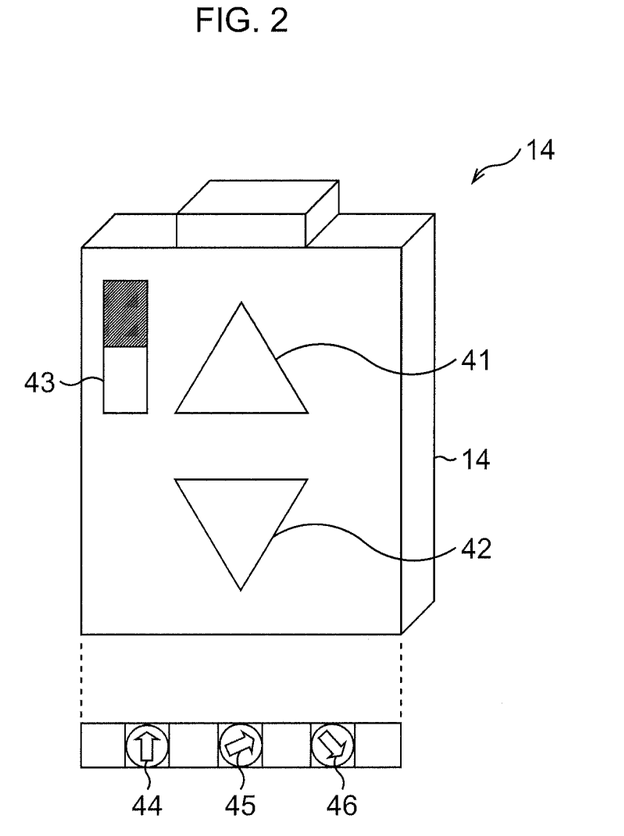
FIG. 2 is a diagram showing a remote commander 14.

FIG. 2 is a perspective view of the remote commander 14. A bottom view of the remote commander 14 is shown below the perspective view.

As shown in FIG. 2, the remote commander 14 includes a zoom up switch 41, a zoom down switch 42, and a function selector switch 43 all provided on a front surface thereof. The remote commander 14 further includes magnification setting switches 44 to 46 provided on a bottom surface thereof.

The zoom up switch 41 or the zoom down switch 42 is operated to change the magnification of the electric zoom 21.

For example, when the user performs an operation of depressing the zoom up switch 41, the remote commander 14 supplies the control section 34 with an operation signal indicating that the zoom up switch 41 has been operated. The control section 34 then supplies the electric zoom control section 32 with a signal specifying an increase in the magnification of the electric zoom 21. This causes the zoom lenses of the electric zoom 21 to move in a direction in which the magnification increases, thus increasing the total magnification of the microscope 12.

Likewise, when the user performs an operation of depressing the zoom down, switch 42, the remote commander 14 supplies the control section 34 with an operation signal indicating that the zoom down switch 42 has been operated. The control section 34 then supplies the electric zoom control section 32 with a signal specifying a decrease in the magnification of the electric zoom 21. This causes the zoom lenses of the electric zoom 21 to move in a direction in which the magnification decreases, thus reducing the total magnification of the microscope 12.

The function selector switch 43 is operated in a switchable manner to enable or disable a function to maintain the total magnification of the microscope 12. For example, the user operates the function selector switch 43 to enable the function to maintain the total magnification of the microscope 12, the process of maintaining the total magnification of the microscope 12 is carried out as described below with reference to FIGS. 4.

The magnification setting switches 44 to 46 are operated to set the magnification of the objective lens installed in the revolver 24.

For example, three objective lenses can be installed in the revolver 24. The magnification setting switch 44 is used to set the magnification of the objective lens installed at the installation location identified by an address 1. Furthermore, the magnification setting switch 45 is used to set the magnification of the objective lens installed at the installation location identified by an address 2. The magnification setting switch 46 is used to set the magnification of the objective lens installed at the installation location identified by an address 3.

For example, the magnification setting switches 44 to 46 are formed of rotary switches. The user sets the positions of the magnification setting switches 44 to 46 in accordance with the magnifications of the objective lenses installed at the installation locations identified by the addresses 1 to 3 in the revolver 24. For example, when the control box 13 is started, the control section 34 reads the positions of the magnification setting switches 44 to 46 and stores the addresses corresponding to the magnification setting switches 44 to 46 and the magnifications corresponding to the read positions in association with one another.

As described above, in the control section 34, the addresses of the installation locations and the magnifications of the objective lenses are stored in association with one another. For example, when the signal supplied by the revolver position detecting section 33 indicates the address 1, the control section 34 calculates the total magnification of the microscope 12 by multiplying the magnification of the objective lens stored in association with the address 1 by the magnification of the electric zoom 21.

Thereafter, for example, when the user rotates the revolver 24 to place the objective lens installed at the installation location indicated by the address 2, on the optical axis in the observation optical path, the revolver position detecting section 33 supplies a signal indicative of the address 2 to the control section 34. At this time, based on the total magnification obtained before the switching of the objective lens and the magnification of the switched objective lens, the control section 34 calculates the target magnification of the electric zoom 21 to be the magnification of the electric zoom 21 required to keep the total magnification obtained after the switching equal to (almost the same as) that obtained before the switching.

When the control section 34 supplies a signal indicative of the target magnification of the electric zoom 21 to the electric zoom control section 32, the electric zoom control section 32 determines the amount by which the zoom lens of the electric zoom 21 is to move, based on the signal. The electric zoom control section 32 then supplies the motor driving circuit 23 with a control signal causing the zoom lens to move by the amount of movement. Thus, the magnification of the electric zoom 21 is changed to the target magnification, allowing the total magnification obtained after the switching of the objective lens to be kept equal to that obtained before the switching of the objective lens.

Now, the process of maintaining the total magnification of the microscope 12 will be described with reference to FIG. 3.

Figure 3:
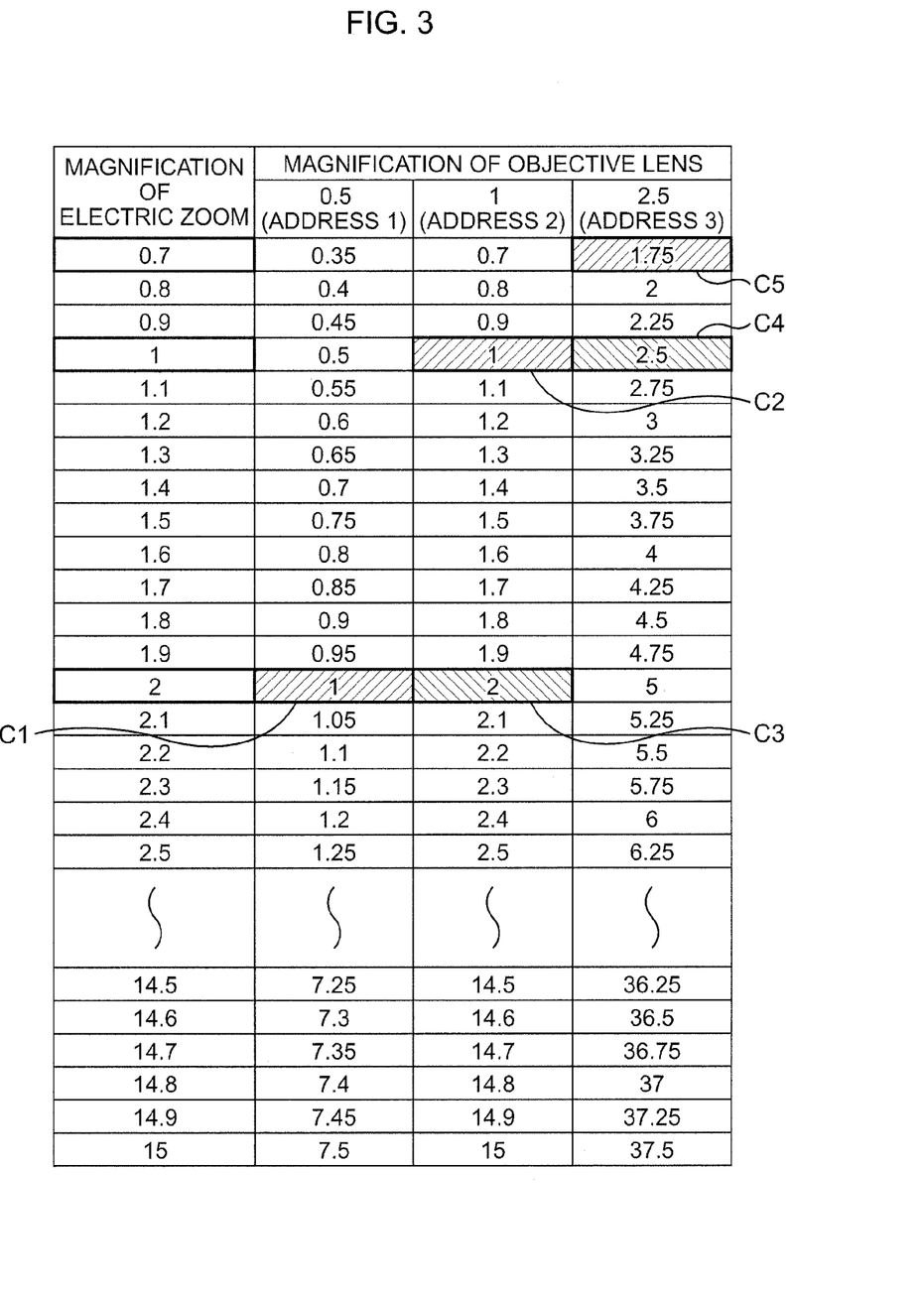
FIG. 3 is a diagram illustrating a process of causing the total magnification of a microscope 12 to be maintained.

FIG. 3 illustrates the relationship between the total magnification of the microscope 12 and both the magnifications of the electric zoom 21 and the objective lens. As illustrated in FIG. 3, the electric zoom 21 allows the magnification thereof to change linearly between 0.7× and 15× in increments of 0.1×. Three objective lenses are installed in the revolver 24. One of the objective lenses which has a magnification of 0.5× is installed at the address 1. Another objective lens of 1× magnification is installed at the address 2. The remaining objective lens, which has a magnification of 2.5×, is installed at the address 3.

The control section 34 calculates Expression (1) to determine and store the current total magnification of the microscope 12.

$$\text{Total magnification} = \text{magnification of the electric zoom} \times \text{magnification of the objective lens} \quad (1)$$

For example, it is assumed that the electric zoom 21 has a 2× magnification and that a 0.5× objective lens (address 1) is placed on the optical axis. Then, the control section 34 calculates the current total magnification of the microscope 12 to be 1× and stores this value. That is, as illustrated in FIG. 3, the current total magnification is 1× illustrated in a grid C1 corresponding to the case where the electric zoom 21 has a 2× magnification, whereas the objective lens has a 0.5× magnification.

Then, when the user rotates the revolver 24 to switch the objective lens such that the 1× objective lens (address 2) is placed on the optical axis, the microscope system 11 carries out a process of maintaining the total magnification of the microscope 12. Thus, after the switching, the total magnification is 1×.

Thus, in order to keep the total magnification at the value obtained before the switching to the 1× objective lens (address 2), that is, at 1×, the control section 34 causes the magnification of the electric zoom 21 to be changed to 1×. Thus, the total magnification obtained after the switching is set to 1×, shown in a grid C2 corresponding to the case where the electric zoom 21 has a 1× magnification, whereas the objective lens has a 1× magnification, as illustrated in FIG. 3.

Here, for example, if the process of maintaining the total magnification of the microscope 12 is not carried out, the result is as follows. When the electric zoom 21 has a magnification of 2×, if the 0.5× objective lens is switched to the 1× objective lens, the total magnification obtained after the switching is 2×, shown in a grid C3 corresponding to the case where the electric zoom 21 has a magnification of 2×, whereas the objective lens has a magnification of 1×, as illustrated in FIG. 3. Thus, if the total magnification changes significantly, some users may miss an observation position on the sample. Such users feel that the microscope is inferior in operability.

In contrast, the microscope system 11 carries out the process of maintaining the total magnification of the microscope 12. Thus, even when the 0.5× objective lens is switched to the 1× objective lens, the total magnification of the microscope 12 remains at 1×. Thus, the user is prevented from missing the observation position on the sample and can easily operate the microscope system 11 for observation. That is, the process of maintaining the total magnification of the microscope 12 serves to improve the operability of the microscope system 11.

Furthermore, it is assumed that when the electric zoom 21 has a magnification of 1× and the 1× objective lens (address 2) is placed on the optical axis, that is, when the microscope 12 has a total magnification of 1× (this corresponds to a grid C2), the user rotates the revolver 24 to switch the objective lens such that the 2.5× objective lens (address 3) is placed on the optical axis in the observation optical path. For example, if the process of maintaining the total magnification of the microscope 12 is not carried out, the total magnification obtained after the switching is 2.5×, shown in a grid C4, as illustrated in FIG. 3.

Here, the microscope system 11 carries out the process of maintaining the total magnification of the microscope 12. However, as illustrated in FIG. 3, none of the possible magnifications of the electric zoom 21 allow the total magnification to be kept at 1× when the 2.5× objective lens (address 3) is used. That is, in order to keep the total magnification at 1× using the 2.5× objective lens, the electric zoom 21 needs to have a magnification of 0.4×. However, the lower limit of the zoom range of the electric zoom 21 is 0.7×, thus preventing the total magnification from being set to 1×.

Thus, if the required magnification of the electric zoom 21 falls outside the range within which the magnification can be varied, thus preventing the total magnification obtained after the switching of the objective lens from being kept equal to that obtained before the switching, then the control section 34 determines the target magnification to be 0.7×, which is the lower limit value of magnification of the electric zoom 21. That is, in the microscope 12, the magnification of the electric zoom 21 is determined such that the total magnification is closest to the value obtained before the switching of the objective lens. In this case, the total magnification obtained after the switching is 1.75×, shown in a grid C5 corresponding to the case where the electric zoom 21 has a magnification of 0.7×, whereas the objective lens has a magnification of 2.5×, as illustrated in FIG. 3.

For example, if as a result of switching of the objective lens, the total magnification of the microscope 12 can be maintained only when the electric zoom 21 has a magnification equal to or greater than the upper limit value, the control section 34 determines the target magnification to be 15×, which is the upper limit value of magnification of the electric zoom 21.

Furthermore, for example, if the electric zoom 21 has a magnification of 2.5× and the objective lens has a magnification of 0.5×, the microscope 12 has a total magnification of 1.25×. Then, when the magnification of the objective lens is changed to 1×, the total magnification of the microscope 12 fails to be equal to 1.25×. In this case, the control section 34 determines the total magnification closest to the value obtained before the switching, that is, 1.2× or 1.3×, which is closest to 1.25×, to be the total magnification obtained after the switching of the objective lens.

Figure 4:
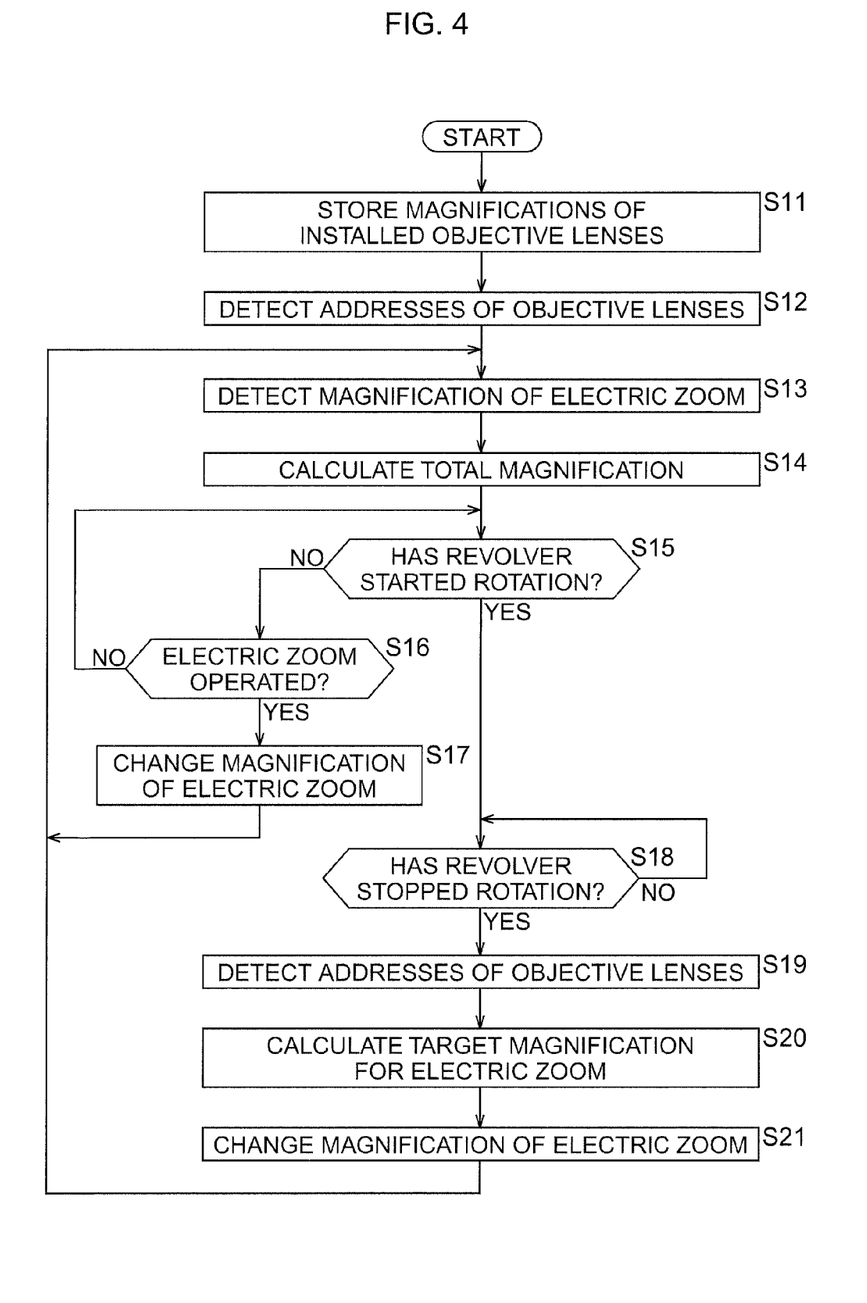
FIG. 4 is a flow chart illustrating the process of causing the total magnification of the microscope 12 to be maintained.

FIG. 4 is a flowchart illustrating a process in which the microscope system 11 causes the total magnification of the microscope 12 to be maintained.

For example, when the microscope system 11 is powered on to start the control box 13, the processing is started. In step S11, the control section 34 reads the magnification of the objective lens installed in the revolver 24 set by the magnification setting switches 44 to 46 on the remote commander 14. Then, the control section 34 stores the addresses corresponding to the magnification setting switches 44 to 46 and the magnifications read from the magnification setting switches 44 to 46 in association with one another. The processing proceeds to step S12.

In step S12, the revolver position detecting section 33 causes the address sensor 26 to detect the address identifying the installation location where the objective lens placed on the optical axis is installed. The revolver position detecting section 33 supplies a signal indicative of the address to the control section 34.

After step S12, the processing proceeds to step S13. The electric zoom magnification detecting section 31 causes the sensor 22 to detect the magnification of the electric zoom 21. The electric zoom magnification detecting section 31 supplies the control section 34 with a signal indicative of the magnification of the electric zoom 21. The processing proceeds to step S14.

In step S14, based on the magnification of the objective lens stored in association with the address indicated by the signal supplied by the revolver position detecting section 33 in step S12 and the magnification of the electric zoom 21 indicated by the signal supplied by the electric zoom magnification detecting section 31 in step S13, the control section 34 calculates Expression (1) described above to calculate the total magnification of the microscope 12.

After step S14, the processing proceeds to step S15. The revolver position detecting section 33 determines, via the stop sensor 25, whether or not the revolver 24 has started rotation.

For example, if a signal from the stop sensor 25 indicates that the revolver 24 has stopped rotation, the revolver position detecting section 33 determines that the revolver 24 has not started rotation. When the signal changes to indicate that the revolver 24 has not stopped rotation, the revolver position detecting section 33 determines that the revolver 24 has started rotation.

In step S15, if the revolver position detecting section 33 determines that the revolver 24 has not started rotation, the processing proceeds to step S16. The control section 34 determines whether or not the user has performed an operation of changing the magnification of the electric zoom 21 using the remote commander 14.

In step S16, if the control section 34 determines that the user has not performed the operation of changing the magnification of the electric zoom 21, the processing returns to step S15. That is, the processing stands by until the control section 34 determines in step S15 that the revolver 24 has started rotation or until the control section 34 determines in step S16 that the user has performed the operation of changing the magnification of the electric zoom 21.

On the other hand, in step S16, if the control section 34 determines that the user has performed the operation of changing the magnification of the electric zoom 21, the processing proceeds to step S17. Based on an operation signal supplied by the remote commander 14, the control section 34 provides the electric zoom control section 32 with a signal specifying an increase or decrease in the magnification of the electric zoom 21. Based on the signal, the electric zoom control section 32 controls the electric zoom 21 via the motor driving circuit 23, thus increasing or reducing the magnification of the electric zoom 21.

After step S17, the processing returns to step S13. Thereafter, similar processing is repeated. In this case, in step S13, the electric zoom magnification detecting section 31 detects the magnification of the electric zoom 21 changed in step S17. In step S14, the total magnification of the microscope 12 is determined using the changed magnification of the electric zoom 21.

On the other hand, in step S15, if the revolver position detecting section 33 determines that the revolver 24 has started rotation, the processing proceeds to step S18.

In step S18, the revolver position detecting section 33 determines, via the stop sensor 25, whether or not the revolver 24 has stopped rotation.

For example, in step S15, the signal from the stop sensor 25 indicates that the revolver 24 has not stopped rotation. When the signal changes to indicate that the revolver 24 has stopped rotation, the revolver position detecting section 33 determines that the revolver 24 has stopped rotation.

The revolver position detecting section 33 stands by until the revolver position detecting section 33 determines that the revolver 24 has stopped rotation. When the revolver position detecting section 33 determines that the revolver 24 has stopped rotation, the processing proceeds to step S19.

In step S19, the revolver position detecting section 33 detects, via the address sensor 26, an address identifying the installation location where the objective lens placed on the optical axis as a result of rotation of the revolver 24 is installed. The revolver position detecting section 33 supplies a signal indicative of the address to the control section 34.

After step S19, the processing proceeds to step S20. The control section 34 reads the magnification of the objective lens stored in association with the address indicated by the signal supplied by the revolver position detecting section 33 in step S19, that is, the control section 34 reads the magnification of the switched objective lens. Then, the control section 34 calculates the target magnification of the electric zoom 21 based on the magnification of the switched objective lens and the total magnification of the microscope 12 obtained before the switching of the objective lens (that is, the total magnification of the microscope 12 calculated in the preceding step S14).

That is, as described with reference to FIG. 3, the control section 34 determines the target magnification of the electric zoom 21 such that the magnification of the switched objective lens serves to maintain the total magnification of the microscope 12 obtained before the switching of the objective lens.

After step S20, the processing proceeds to step S21. The control section 34 supplies the electric zoom control section 32 with a signal indicative of the target magnification of the electric zoom 21 calculated in step S20. Based on the signal, the electric zoom control section 32 controls the electric zoom 21 via the motor driving circuit 23. In the electric zoom 21, the motor drives the zoom lens under the control of the electric zoom control section 32 to set the magnification of the electric zoom 21 to the target value.

After step S21, the processing proceeds to step S13. Thereafter, similar processing is repeated. In this case, in step S13, the electric zoom magnification detecting section 31 detects the magnification of the electric zoom 21 changed in step S21. In step S14, the total magnification of the microscope 12 is determined using the changed magnification of the electric zoom 21.

As described above, the microscope system 11 keeps the total magnification of the microscope 12 obtained after the switching of the objective lens equal to that obtained before the switching. This prevents the user from missing an observation position on the sample, allowing the operability of the microscope system 11 to be improved.

Figure 5:
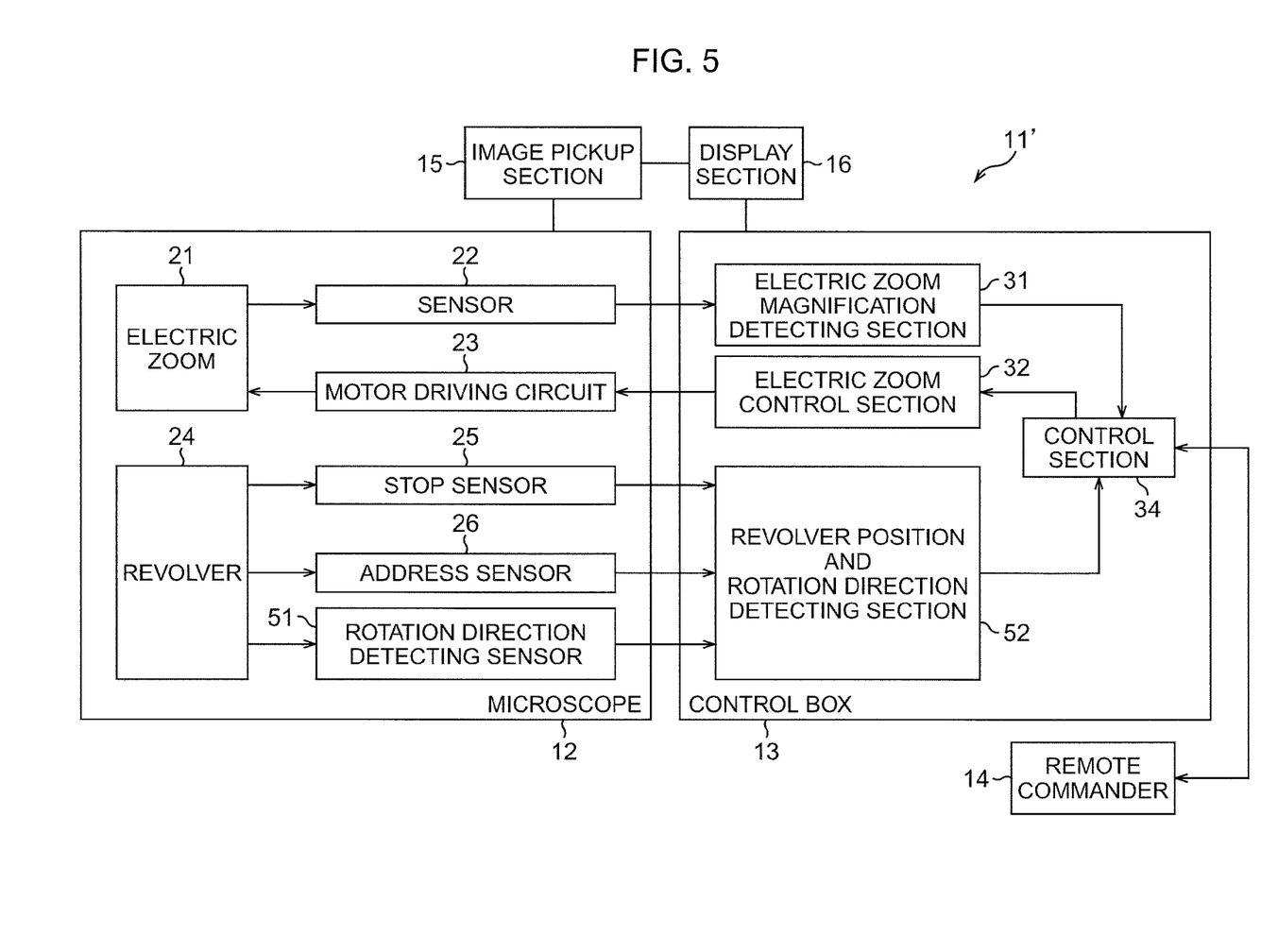
FIG. 5 is a block diagram illustrating an example of configuration of another embodiment of a microscope system to which the present invention is applied.

FIG. 5 is a block diagram illustrating an example of configuration of anther embodiment of the microscope system to which the present invention is applied.

Blocks of a microscope system 11' illustrated in FIG. 5 which are common to the microscope system 11 in FIG. 1 are denoted by the same reference numerals. Description of these blocks is hereinafter appropriately omitted.

That is, the microscope system 11' is the same as the microscope system 11 in FIG. 1 in the following aspects. The microscope system 11' includes a microscope 12, a control box 13, a remote commander 14, a pickup section 15, and a display section 16. The microscope 12 includes an electric zoom 21, a sensor 22, a motor driving circuit 23, a revolver 24, a stop sensor, 25, and an address sensor 26. The control box 13 includes an electric zoom magnification detecting section 31, an electric zoom control section 32, and a control section 34.

However, the microscope system 11' is different from the microscope system 11 in FIG. 1 in that the microscope 12 includes a rotation direction detecting sensor 51 and in that the control box 13 includes a revolver position and rotation direction detecting section 52.

The rotation direction detecting sensor 51 includes, for example, a small-sized permanent magnet provided in the revolver 24 and a hall element provided in the main body of the microscope 12. When the user manually rotates the revolver 24, the rotation direction detecting sensor 51 detects the rotation direction of the revolver 24 to supply the revolver position and rotation direction detecting section 52 of the control box 13 with a signal indicative of the rotation direction of the revolver 24.

The revolver position and rotation direction detecting section 52 is configured to store the positional relationship between the installation locations of objective lenses in the revolver 24 and addresses identifying the installation locations. When supplied with a signal from the rotation direction detecting sensor 51 which is indicative of the rotation direction of the revolver 24, the revolver position and rotation direction detecting section 52 operates as follows. Based on the signal from the rotation direction detecting sensor 51 and the positional relationship between the installation locations of objective lenses in the revolver 24, the revolver position and rotation direction detecting section 52 predicts the objective lens installed at the installation location lying away, in the rotation direction, from the installation location of the objective lens placed on the optical axis, that is, the revolver position and rotation direction detecting section 52 predicts the objective lens to be placed on the optical axis after rotation of the revolver 24 and supplies the control section 34 with a signal indicative of an address identifying the installation location where the predicted objective lens is installed.

The control section 34 determines the magnification of the objective lens stored in association with the address indicated by the signal supplied by the revolver position and rotation direction detecting section 52 to be the magnification of the objective lens predicted to be placed on the optical axis. Then, the control section 34 calculates the target magnification of the electric zoom 21 based on the magnification of the predicted objective lens and the total magnification obtained before the switching of the objective lens.

That is, when the revolver 24 starts rotation, the control section 34 calculates the target magnification of the electric zoom 21 based on the magnification of the objective lens predicted based on the rotation direction, before the revolver 24 stops rotation. Moreover, before the revolver 24 stops rotation, the control section 34 supplies the electric zoom control section 32 with a signal indicative of the target magnification of the electric zoom 21 based on the prediction. The control section 34 thus sets the magnification of the electric zoom 21 to the target value.

Thereafter, upon detecting, via the stop sensor 25, that the revolver 24 has stopped rotation, the control section 34 checks, via the address sensor 26, the objective lens actually placed on the optical axis. At this time, if the predicted objective lens is different from the objective lens actually placed on the optical axis, the control section 34 calculates the target magnification again based on the magnification of objective lens actually placed on the optical axis, to re-set the magnification of the electric zoom 21. Thus, the total magnification of the microscope 12 is corrected.

Figure 6:
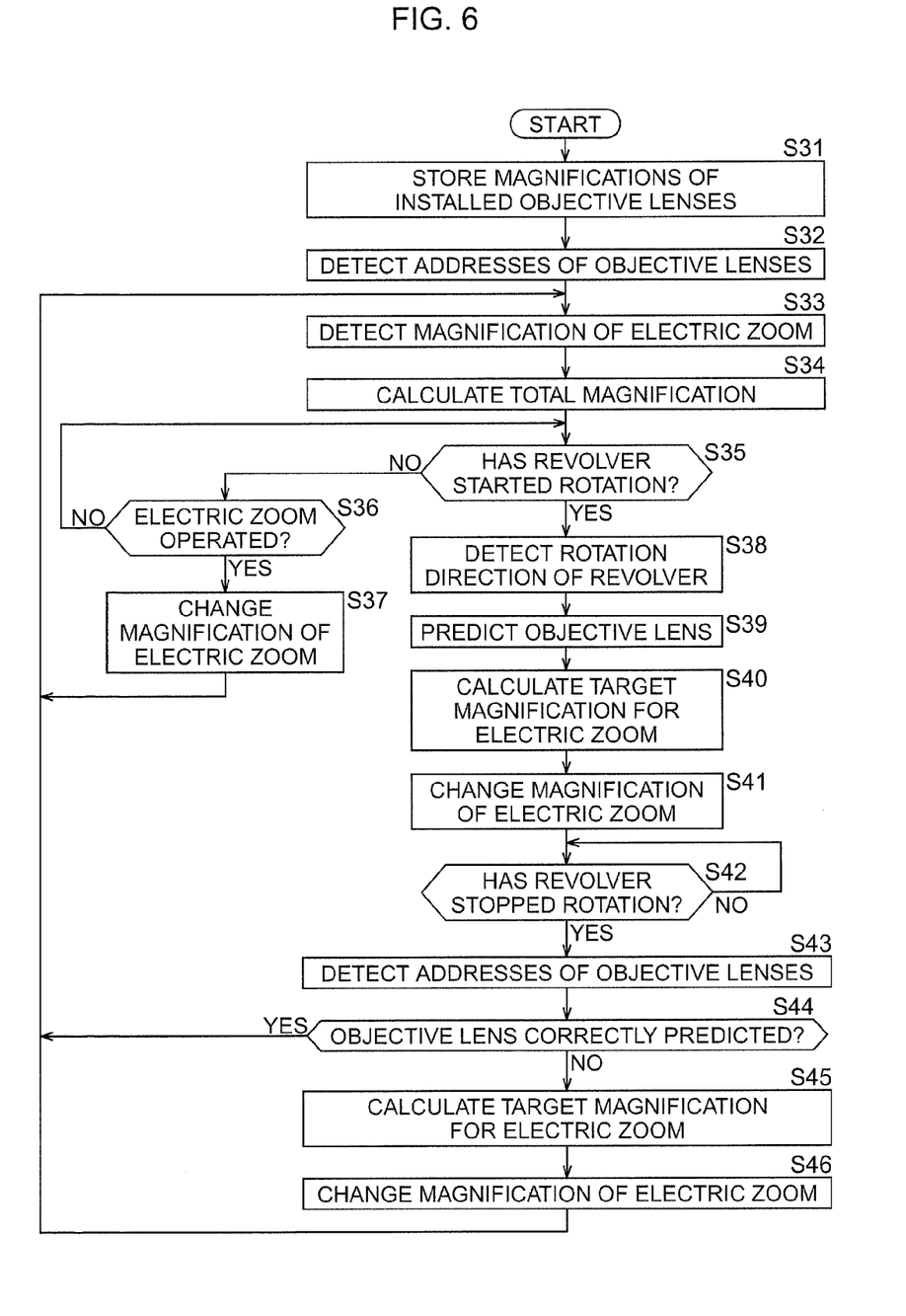
FIG. 6 is a flow chart illustrating the process of causing the total magnification of the microscope 12 to be maintained.

FIG. 6 is a flowchart illustrating a process in which the microscope system 11' maintains the total magnification of the microscope 12.

In the flowchart in FIG. 6, the processing between step S31 and step S37 is similar to that between step S11 and step S17 in FIG. 4.

In step S35, if the revolver position detecting section 33 determines that the revolver 24 has started rotation, the processing proceeds to step S38. The rotation direction detecting sensor 51 detects the rotation direction of the revolver 24. The rotation direction detecting sensor 51 supplies the revolver position and rotation direction detecting section 52 with a signal indicative of the rotation direction of the revolver 24. The processing proceeds to step S39.

In step S39, based on the signal from the rotation direction detecting sensor 51, the revolver position and rotation direction detecting section 52 predicts the objective lens placed on the optical axis after the rotation of the revolver 24. That is, based on the positional relationship among the installation locations of the objective lenses in the revolver 24, the revolver position and rotation direction detecting section 52 predicts that the objective lens installed at any installation location in the rotation direction is to be placed on the optical axis after the rotation. The revolver position and rotation direction detecting section 52 then supplies the control section 34 with a signal indicative of an address identifying the installation location. The processing proceeds to step S40.

In step S40, the control section 34 reads the magnification of the objective lens stored in association with the address indicated by the signal supplied by the revolver position and rotation direction detecting section 52 in step S39, that is, the control section 34 reads the magnification of the predicted objective lens. Then, the control section 34 calculates the target magnification of the electric zoom 21 based on the magnification of the predicted objective lens and the total magnification of the microscope 12 obtained before the switching of the objective lens (that is, the total magnification of the microscope 12 calculated in the preceding step S34) such that the magnification of the switched objective lens serves to maintain the total magnification of the microscope 12 obtained before the switching of the objective lens.

After step S40, the processing proceeds to step S41. The control section 34 supplies the electric zoom control section 32 with a signal indicative of the target magnification of the electric zoom 21 calculated in step S40. Based on the signal, the electric zoom control section 32 controls the electric zoom 21 via the motor driving circuit 23. In the electric zoom 21, the motor drives the zoom lens under the control of the electric zoom control section 32 to set the magnification of the electric zoom 21 to the target value. The processing proceeds to step S42.

In step S42, the revolver position detecting section 33 determines, via the stop sensor 25, whether or not the revolver 24 has stopped rotation. The revolver position detecting section 33 stands by until the revolver position detecting section 33 determines that the revolver 24 has stopped rotation. The processing proceeds to step S43.

In step S43, the revolver position and rotation direction detecting section 52 detects, via the address sensor 26, the address identifying the installation location where the objective lens placed on the optical axis is installed. The revolver position and rotation direction detecting section 52 supplies the control section 34 with a signal indicative of the address. Then, the control section 34 determines whether or not the objective lens is correctly predicted, that is, whether or not the predicted objective lens is the same as the objective lens actually placed on the optical axis.

For example, the control section 34 determines that the objective lens has been correctly predicted when the address in the revolver 24 based on the signal supplied by the revolver position and rotation direction detecting section 52 in the preceding step S39 is the same as that based on the signal supplied by the revolver position and rotation direction detecting section 52 in step S43. On the other hand, the control section 34 determines that the objective lens has not been correctly predicted when the addresses are different from each other.

In step S44, if the control section 34 determines that the objective lens has been correctly predicted, the processing returns to step S33. Thereafter, similar processing is repeated.

On the other hand, in step S44, the control section 34 determines that the objective lens has not been correctly predicted, the processing proceeds to step S45. The control section 34 uses the magnification of the objective lens actually placed on the optical axis to calculate the target magnification of the electric zoom 21.

After step S45, the processing proceeds to step S46. The control section 34 supplies the electric zoom control section 32 with a signal indicative of the target magnification of the electric zoom 21 calculated in step S45. Based on the signal, the electric zoom control section 32 controls the electric zoom 21 via the motor driving circuit 23. In the electric zoom 21, the motor drives the zoom lens under the control of the electric zoom control section 32 to set the magnification of the electric zoom 21 to the target value.

After step S46, the processing returns to step S33. Thereafter, similar processing is repeated.

As described above, in the microscope system 11', when the revolver 24 is detected to be rotating, the electric zoom 21 is controlled in accordance with the objective lens predicted based on the rotation direction of the revolver 24. Thus, the total magnification of the microscope 12 can be adjusted more quickly than when the electric zoom 21 is controlled after the revolver 24 stops rotation. Hence, when the objective lens is switched, the associated time for which the user needs to wait can be shortened. Therefore, the operability can be improved.

Furthermore, for example, if the user rotates the revolver 24 in one direction and then in the other direction before the objective lens located away in the one direction is placed on the optical axis, the control section 34 may fail to accurately predict the objective lens to be placed on the optical axis. Even in such a case, in the microscope system 11', when the objective lens cannot be accurately predicted, the magnification of the electric zoom 21 is corrected based on the objective lens actually placed on the optical axis. Thus, even if the objective lens is erroneously predicted based on the rotation direction, the total magnification of the microscope 12 can be reliably maintained.

In the microscope system 11, the control section 34 can control the display of the image on the display section 16. The display section 16 displays images picked up by the image pickup section 15 via the microscope 12. The control section 34 controllably causes the display section 16 to stop displaying images after the revolver 24 starts rotation and before the revolver 24 stops rotation.

For example, in step S15 in the flowchart in FIG. 4 (or step S35 in FIG. 6), if the revolver position detecting section 33 determines that the revolver 24 has started rotation, then immediately before the rotation, the control section 34 controllably causes the display section 16 to stop displaying an image (live image) being picked up by the image pickup section 15. Then, the control section 34, for example, causes the display section 16 to display a solid black image or continuously display an image displayed immediately before the rotation of the revolver. Then, after the magnification of the electric zoom 21 is set to the target magnification in step S21 in the flowchart in FIG. 4 (or step S46 in FIG. 6), the control section 34 controllably causes the display section 16 to resume displaying the live image.

When the control section 34 controls the display of the image by the display section 16 as described above, the display section 16 is prevented from displaying images obtained during a change in the magnification of the electric zoom 21 which change results from switching of the objective lens. Thus, the display section 16 displays images such that the total magnification of the microscope 12 obtained after the switching of the objective lens is kept equal to that obtained before the switching. As a result, the user is more unlikely to miss the sample than when the display section 16 displays images obtained during the change. That is, the user is more unlikely to miss the sample than when the electric zoom 21 is changing the magnification, with the display section 16 temporarily displaying images of a magnification different from that obtained before and after the switching of the objective lens. Therefore, the user can concentrate on observation and make smooth observations.

Moreover, for example, while the display of live images is stopped (for example, while a solid black image is being displayed or the image obtained immediately before the rotation of the revolver is being continuously displayed), the control section 35 may display a message at an end of the display section 16 which message indicates that the magnification of the electric zoom 21 is being changed. This allows the user to understand the reason why the display of live images is stopped and feel less uncomfortable with the stopped display of live images.

In the present embodiment, the microscope 12 and the control box 13 are configured separately from each other. However, the control box 13 may be incorporated into the microscope 12.

Besides the configuration in which the magnification of the electric zoom 21 is changed using the remote commander 14, the following configuration is possible. For example, the control box 13 is configured to provide a communication function such as RS232C or USB, and the control box 13 is connected to a personal computer. The personal computer supplies communication commands to the control box 13 to instruct the control box 13 to perform various operations.

As illustrated in FIG. 2, the remote commander 14 includes the function selector switch 43. The user can operate the function selector switch 43 to appropriately disable the function to maintain the total magnification of the microscope 12. By thus switching the function to maintain the total magnification of the microscope 12, for example, those skilled in the art can more smoothly operate the microscope system 11.

Furthermore, for example, a rotary encoder can be used to detect the rotation of the revolver 24. When the rotary encoder is used to detect the rotation of the revolver 24, the rotation of the revolver 24 can be detected more reliably than when a sensor with a hall element or the like is used for this purpose. Thus, the objective lens is accurately predicted, thus eliminating the need for correction after the revolver 24 has stopped rotation.

The processes described above with reference to the flowcharts need not necessarily be carried out in a time series manner in accordance with the orders described in the flowcharts and may be executed in parallel or individually (for example, parallel processing or processing based on objects). Furthermore, the program may be processed by one CPU or by a plurality of CPUs in a distributive manner. Moreover, the program executed by the CPU of the control section 34 may be appropriately downloaded into the memory of the control section 34 for updating.

Furthermore, in the present specification, the system refers to the whole apparatus formed of a plurality of devices.

The embodiment of the present invention is not limited to the above-described one. Various changes may be made to the above-described embodiment without departing from the spirit of the present invention.

[Reference Signs List]

11 Microscope system, 12 Microscope, 13 Control box, 14 Remote commander, 15 Image pickup section, 16 Display section, 21 Electric zoom, 22 Sensor, 23 Motor driving circuit, 24 Revolver, 25 Stop sensor, 26 Address sensor, 31 Electric zoom magnification detecting section, 32 Electric zoom control section, 33 Revolver position detecting section, 34 Control section, 41 Zoom up switch, 42 Zoom down switch, 43 Function selector switch, 44 to 46 Magnification setting switches, 51 Rotation direction detecting sensor, 52 Revolver position and rotation direction detecting section

What is claimed is:

1. A microscope system comprising:
a zoom section having a changeable zoom magnification to magnify a sample being observed along an observation optical path by the microscope system;
a switching section including a plurality of objective lenses having a plurality of different magnifications, respectively, the switching section being operable to insert a respective objective lens of the plurality of objective lenses in the observation optical path so that the sample is magnified with both the magnification of said respective objective lens and the zoom magnification of the zoom section, and to then remove the respective objective lens from the observation optical path and insert a different objective lens of the plurality of objective lenses in the observation optical path to thereby switch from said respective objective lens to said different objective lens so that the sample is magnified with the magnification of said different objective lens and the zoom magnification of the zoom section;
a zoom magnification determining section to determine the zoom magnification of the zoom section to be used when said different objective lens is inserted in the observation optical path so that a total magnification of the magnification of said different objective lens inserted into the observation optical path and the zoom magnification of the zoom section is equal to a total magnification of the magnification of said respective objective lens and the zoom magnification of the zoom section when said respective objective lens was inserted in the observation optical path; and
a zoom control section to control the zoom section, the zoom magnification of the zoom section being set equal to the zoom magnification determined by the zoom magnification determining section.

2. The microscope system according to claim 1, wherein, when the zoom magnification of the zoom section required to maintain the total magnification of the magnification of said different objective lens inserted into the observation optical path and the zoom magnification of the zoom section equal to the total magnification of the magnification of said respective objective lens and the zoom magnification of the zoom section when said respective objective lens was inserted in the observation optical path is equal to or higher than an upper limit value of a zoom range within which the zoom magnification can be varied by the zoom section, the zoom magnification determining section determines the upper limit value to be the zoom magnification, and when the zoom magnification of the zoom section required to maintain the total magnification of the magnification of said different objective lens inserted into the observation optical path and the zoom magnification of the zoom section equal to the total magnification of the magnification of said respective objective lens and the zoom magnification of the zoom section when said respective objective lens was inserted in the observation optical path is equal to or lower than a lower limit value of a zoom range within which the zoom magnification can be varied by the zoom section, the zoom magnification determining section determines the lower limit value to be the zoom magnification.

3. The microscope system according to claim 1, wherein switching section is a revolver configured to switch the plurality of objective lenses, respectively, to be inserted in the observation optical path by rotating around a predetermined axis of rotation,
the microscope system further comprising:
a rotation detecting section to detect that the revolver has started rotation; and
a rotation direction detecting section to detect a rotation direction of the switching section, and
when the switching detecting section detects that the revolver has started rotation, the zoom magnification determining section predicts an objective lens of the plurality of objective lenses to be inserted in the observation optical path based on the rotation direction detected by the rotation direction detecting section, and determines the zoom magnification based on the prediction.

4. The microscope system according to claim 1, further comprising:
a display section to display a picked-up image of the sample via an objective lens of the plurality of objective lenses inserted in the observation optical path and the zoom section;
a switching detecting section to detect that the switching section has started switching from said objective lens to said different objective lens; and
a display control section to stop display of the image on the display section after the switching detecting section detects that the switching has started until the zoom control section finishes changing the magnification of the zoom section to the determined zoom magnification.

5. A microscope system comprising:
a zoom section having a changeable zoom magnification to magnify a sample being observed along an observation optical path by the microscope system;
a switching section including a plurality of objective lenses having a plurality of different magnifications, respectively, the switching section being operable to insert a respective objective lens of the plurality of objective lenses in the observation optical path so that the sample is magnified with both the magnification of said respective objective lens and the zoom magnification of the zoom section, and to then remove the respective objective lens from the observation optical path and insert a different objective lens of the plurality of objective lenses in the observation optical path to thereby switch from said respective objective lens to said different objective lens so that the sample is magnified with the magnification of said different objective lens and the zoom magnification of the zoom section;

a zoom magnification determining section which performs one of:
  determining the zoom magnification of the zoom section to be used when said different objective lens is inserted in the observation optical path so that a total magnification of the magnification of said different objective lens inserted into the observation optical path and the zoom magnification of the zoom section is equal to a total magnification of the magnification of said respective objective lens and the zoom magnification of the zoom section when said respective objective lens was inserted in the observation optical path, and
  when the zoom magnification determination section cannot determine a zoom magnification so that the total magnification of the magnification of said different objective lens inserted into the observation optical path and the zoom magnification of the zoom section is equal to the total magnification of the magnification of said respective objective lens and the zoom magnification of the zoom section when said respective objective lens was inserted in the observation optical path,
    determining the zoom magnification to be a zoom magnification to which the zoom section is changeable and which serves to set the zoom magnification to be used when said different objective lens is inserted in the observation optical path closest to the total magnification of the magnification of said respective objective lens and the zoom magnification of the zoom section when said respective objective lens was inserted in the observation optical path; and
a zoom control section to control the zoom section, the zoom magnification of the zoom section being set equal to the zoom magnification determined by the zoom magnification determining section.

6. An observation control method for a microscope comprising a zoom section having a changeable zoom magnification to magnify a sample being observed along an observation optical path by the microscope, and a plurality of objective lenses of different magnifications, respectively, the observation control method comprising:
  inserting a respective objective lens of the plurality of objective lenses in the observation optical path so that the sample is magnified with both the magnification of said respective objective lens and the zoom magnification of the zoom section;
  removing the respective objective lens from the observation optical path and inserting a different objective lens of the plurality of objective lenses in the observation optical path to thereby switch from said respective objective lens to said different objective lens so that the sample is magnified with the magnification of said different objective lens and the zoom magnification of the zoom section;
  determining the zoom magnification of the zoom section to be used when said different objective lens is inserted in the observation optical path so that a total magnification of the magnification of said different objective lens inserted into the observation optical path and the zoom magnification of the zoom section is equal to a total magnification of the magnification of said respective objective lens and the zoom magnification of the zoom section when said respective objective lens was inserted in the observation optical path; and
  controlling the zoom section in such a manner that, when said different objective lens is inserted in the observation optical path, the zoom magnification of the zoom section is set equal to the determined zoom magnification.

7. A microscope system comprising:
a first objective lens having a first magnification; and
a second objective lens having a second magnification different from the first magnification, the first and second objective lenses being individually insertable in an observation optical path to magnify a sample being viewed along the observation optical path by the microscope system, wherein
  when the first objective lens is inserted in the observation optical path without the second objective lens being inserted in the observation optical path, the microscope causes the sample to be magnified with the first magnification and a first zoom magnification provided by the microscope system to thereby provide a first total magnification,
  when the first objective lens having been inserted in the observation optical path is removed from the observation optical path and the second objective lens is thereafter inserted in the observation optical path, the microscope causes the sample to be magnified with the second magnification and a second zoom magnification provided by the microscope system to thereby provide a second total magnification, and
  the microscope system changes the first zoom magnification to the second zoom magnification so that the second total magnification equals the first total magnification.

8. A microscope system comprising:
a first objective lens having a first magnification;
a second objective lens having a second magnification different from the first magnification, the first and second objective lenses being individually insertable in an observation optical path to magnify a sample being viewed along the observation optical path by the microscope system;
means, when the first objective lens is inserted in the observation optical path without the second objective lens being inserted in the observation optical path, for magnifying the sample with the first magnification and a first zoom magnification to thereby provide a first total magnification;
means, when the first objective lens having been inserted in the observation optical path is removed from the observation optical path and the second objective lens is thereafter inserted in the observation optical path, for magnifying the sample with the second magnification and a second zoom magnification to thereby provide a second total magnification; and
means for changing the first zoom magnification to the second zoom magnification so that the second total magnification equals the first total magnification.

* * * * *